United States Patent
Otake et al.

[11] 4,019,809
[45] Apr. 26, 1977

[54] ELECTROCHROMIC DISPLAY DEVICE

[75] Inventors: Tsutomu Otake; Hiroshi Takeshita; Akihiko Kouchi, all of Suwa; Kunihiro Inoue, Okaya, all of Japan

[73] Assignee: Kabushiki Kaisha Suwa Seikosha

[22] Filed: June 25, 1975

[21] Appl. No.: 590,343

[30] Foreign Application Priority Data

June 25, 1974  Japan .............................. 49-72492

[52] U.S. Cl. ........................... 350/160 R; 313/101; 313/483
[51] Int. Cl.² ...................... G02B 5/23; G02E 1/01
[58] Field of Search ................. 313/507, 483, 232; 350/160 R (U.S. only)

[56] References Cited

UNITED STATES PATENTS

| | | | |
|---|---|---|---|
| 3,495,088 | 2/1970 | Kohashi | 313/507 X |
| 3,559,190 | 1/1971 | Bitzer et al. | 313/484 X |
| 3,839,857 | 10/1974 | Berets et al. | 350/160 R |
| 3,864,589 | 2/1975 | Schoot et al. | 313/483 X |
| 3,932,025 | 1/1976 | Lakatos et al. | 350/160 R |

Primary Examiner—Robert Segal
Attorney, Agent, or Firm—Blum, Moscovitz, Friedman & Kaplan

[57] ABSTRACT

A display device includes a layer of photoconductive material and a layer of electrochromic material between electrodes. The device is useful as an image converter for the spectrum from X-rays to infra-red and as a memory device.

7 Claims, 2 Drawing Figures

ELECTROCHROMIC DISPLAY DEVICE

BACKGROUND OF THE INVENTION

Conventional display device, and particularly, those used for image conversion, include the combination of a photoconductive material such as CdS and an electroluminescent element, or a photoconductive material in combination with a transparent ceramic. However, each of these combinations is less than ideal. For example, so far as the combination of the photoconductive material and the electroluminescent element is concerned, the voltage required for operation is high and the luminous efficiency is low. With respect to the display device incorporating a transparent ceramic, the cost of manufacture of the transparent ceramic is high and the size range is narrow, because it is impossible to make a large element of this type.

As is apparent, then, there is need for a display device useful as an image converter and as a memory device, where the display device can be of large size and present an image with fine detail and in high contrast.

SUMMARY OF THE INVENTION

A device in accordance with the present invention consists essentially of a layer of a photoconductive material and an electrochromic material against one face thereof, the photoconductive material and the electrochromic material being sandwiched by two electrodes in contact therewith. The electrode in contact with the photoconductive material must be transparent so that light can pass therethrough and impinge on the photoconductive material. Preferably the electrodes are supported on substrates, the substrate supporting the transparent electrode also being transparent. Where the device is to be viewed from the side opposite that on which the light is falling, the electrode contiguous with the photochromic material and the substrate on which it is supported must also be transparent.

Preferably, the electrochromic material is held in one or more openings in an insulating material which may be of plastic. The opening preferably are not larger than 5 mm in diameter, it being noted that they may be of any convenient shape. Also, there may be only one opening.

Images are formed by allowing light to fall on the photoconductive material which is in series, electrically, with the electrochromic material. The images may be in the form of pictures or of indicia. The resistance of the photoconductive material changes locally in accordance with the intensity of the light falling thereon.

A preferred electroconductive material is viologen bromide, which becomes colored on the application of a voltage when light impinges thereon. The material of which the photoconductive material consists depends upon the frequency of the radiation of which the image is formed, it being the objective of the device to convert the radiation, generally in invisible light, into a high-contrast visible image.

The electrochromic material is preferably viologen bromide which may be used in concentrations from 0.01 molar to saturation. A preferred concentration is about 0.1 molar.

Accordingly, an object of the present invention is a display device based on a photoconductive material and an electrochromic material in contact therewith, these two materials being between conductive electrodes, at least the electrode in contact with the photoconductive material being transparent.

Another object of the present invention is a display device useful as an image converter covering the spectrum from X-rays to infra-red and as a memory unit.

A further object of the present invention is a display device based on the use of a photoconductive material and an electrochromic material in combination where the size of the display device is essentially unlimited and whereby imaging in fine detail and in high contrast can be carried out.

An important object of the present invention is a display device based on a photoconductive material and an electrochromic material in combination wherein the cost of production is low and which is free of the difficulties involved in preparation of electroluminescent materials and transparent ceramics.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENTS

Figure 1:
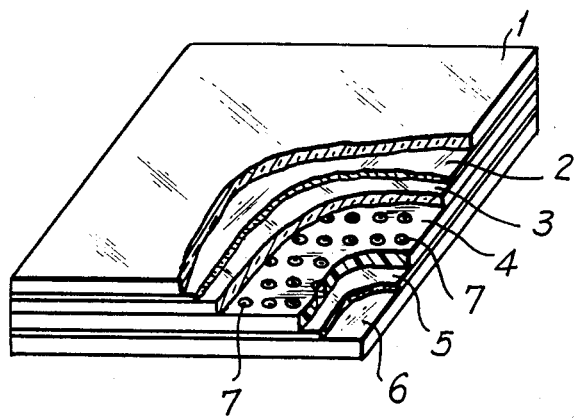
FIG. 1 is a partially-broken away view in perspective of a device in accordance with the present invention.

Referring to FIG. 1, the device in accordance with the present invention consists of a transparent substrate 1 of a material such as soda-lime glass or borosilicate glass, a transparent electrode 2 of a material such as tin oxide, a photoconductive layer 3, the composition of which will be presented below, a display substrate 4 which is preferably of a plastic and which is provided with openings 7 for enclosing a solution of an electrochromic material, an electrode 5 and a substrate 6 for supporting said electrode 5.

As shown in FIG. 1, there are multiple openings 7 in display substrate 4, but when the resistance of the solution of the electrochromic material is high, even a single large opening will suffice.

Images are formed by projecting a picture of a character through transparent substrate 1 onto photoconductive material 2 and imposing a voltage between electrodes 2 and 5. The resistance of the photoconductive material decreases locally in accordance with the intensity of the light falling thereon. This changes correspondingly the voltage across the electrochromic material. In other words, there are local variations in the voltage across the electrochromic material. Consequently, there are different voltages across the various openings in substrate 4 or, where there is only one opening and the electrochromic material is of high resistance, there are corresponding local variations in the voltage across the electrochromic material.

Figure 2:
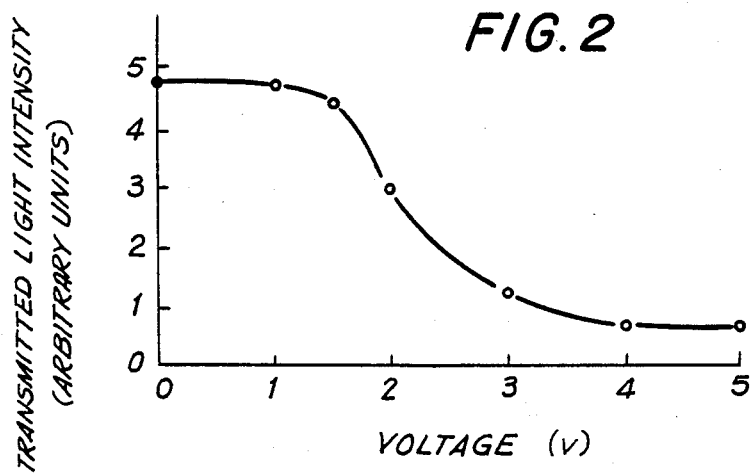
FIG. 2 is a graph of voltage applied across the electrochromic material versus the transmitted light intensity in arbitrary units.

The transparency of the electrochromic material changes in accordance with the voltage applied thereacross, an appropriate voltage for developing the full range of contrast being about 4 to 5 volts as shown in FIG. 2. FIG. 2 shows the change in transmitted light intensity in arbitrary units as a function of the voltage applied across the electrochromic material. The thickness of the display substrate, each of the openings therein being filled with an electrochromic material, should be in the range of 10 microns to 1 mm. A preferred thickness is 100 to 300 microns. A preferred material is viologen bromide, suitable concentrations of viologen bromide in solvent being from 0.01 molar to saturation. A concentration of about 0.1 molar is preferred. Suitable solvents are water, ethyl alcohol and methyl alcohol.

Where the display cell is to be observed at a distance of about one meter, the diameter of the openings in the display substrate should be no more than about 5 mm in order to provide maximum detail. Naturally, where the electrochromic material is of high resistance and is in a single opening, this restriction does not apply. In general, it is desirable that the diameter of the openings be sufficiently small so that the effect is that of a halftone image, though, of course, this is not necessary.

The photoconductive layer should be in the range of 0.5 to 10 $\mu$ in thickness. Suitable materials are PbO where an X-ray image is to be made viisible, ZnS, or ZnO for the display of ultraviolet ray images and PbS, PbSe, or $Cd_xHg_{1-x}Te$ for display of infra-red images.

Certin types of electrochromic materials, of which viologen bromide is an example, become transparent upon the removal of the imposed voltage. Obviously, such electrochromic materials cannot be the basis for memory units. However, some conventional electrochromic material retain their color until a voltage of the opposite polarity is applied. Consequently, devices utilizing such electrochromic materials can be used as memory units.

Where the device is to be viewed from the side away from the photoconductive layer, electrode 5 and substrate 6 must be transparent. Further, the device can be used as a memory unit or as a non-memory unit, depending upon the voltage applied.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A display device useful as an image converter over the range from X-rays to infra-red and as a memory — non-memory device, comprising in spatial sequence, a first transparent substrate a transparent first electrode supported on said first transparent substrate, a layer of photoconductive material, a layer of insulating material having a multiplicity of openings therethrough, said opening having a maximum diameter of 5 mm and being arranged to produce a halftone effect, a second electrode, and a second transparent substrate, said second electrode being supported on said second transparent substrate and said openings containing electrochromic material making conductive paths between said layer of photoconductive material and said second electrode, said electrochromic material being viologen bromide and said insulating material being between 10 and 1 mm. in thickness.

2. The display device as defined in claim 1, wherein said viologen bromide is dissolved in a member of the group consisting of water, ethyl alcohol and methyl alcohol.

3. The display device as defined in claim 1, wherein said electrochromic material is present as a solution at a concentration between 0.01 mol/1 and saturation.

4. The display device as defined in claim 3, wherein the concentration of said electrochromic material in said solution is about 0.1 mol/1.

5. The display device as defined in claim 1, wherein the thickness of said electrochromic material is from $100\mu$ to $300\mu$.

6. The display device as defined in claim 1, wherein the thickness of said photoconductive layer is from $0.5\mu$ to $10\mu$.

7. The display device as defined in claim 1, wherein said photoconductive layer is of a member of the group consisting of PbO, which is sensitive to X-rays, PbS, PbSe, and $Cd_xHg_{1-x}Te$, which are sensitive to infra-red rays, and ZnS and ZnO which are sensitive to ultraviolet rays.

* * * * *